Jan. 30, 1923.

Z. DOMINGUEZ.
WIND POWER WHEEL.
FILED NOV. 27, 1920.

1,443,912.

Inventor:—
Zacaria Dominguez.
By Hazard & Miller
Attys.

Patented Jan. 30, 1923.

1,443,912

UNITED STATES PATENT OFFICE.

ZACARIAS DOMINGUEZ, OF LOS ANGELES, CALIFORNIA.

WIND-POWER WHEEL.

Application filed November 27, 1920. Serial No. 426,866.

*To all whom it may concern:*

Be it known that I, ZACARIAS DOMINGUEZ, a subject of the King of Spain, residing at Los Angeles, in the county of Los Angeles and State of California, have invented new and useful Improvements in Wind-Power Wheels, of which the following is a specification.

My invention relates to wind power wheels, the principal object of my invention being to provide a relatively simple and efficient structure in the nature of a wheel or rotating frame upon which is mounted a plurality of vanes or wings, the latter being transversely curved and disposed so as to utilize to the greatest advantage the power of wind pressure against them, and which power is transmitted to a main driving shaft, from whence it may be taken and utilized in any desired and well-known manner.

Further objects of my invention are to construct a wind power wheel having a vertical axis of rotation and to arrange the vanes or blades in upright or substantially vertical positions around said axis, said vanes or blades being transversely curved on definite or predetermined arcs, which arrangement is instrumental in producing an apparatus that is capable of producing relatively great power with minimum weight and relatively small area of vane or wing surface.

With the foregoing and other objects in view, my invention consists in certain novel features of construction and arrangement of parts that will be hereinafter more fully described and claimed and illustrated in the accompanying drawing, in which:

Figure 1:
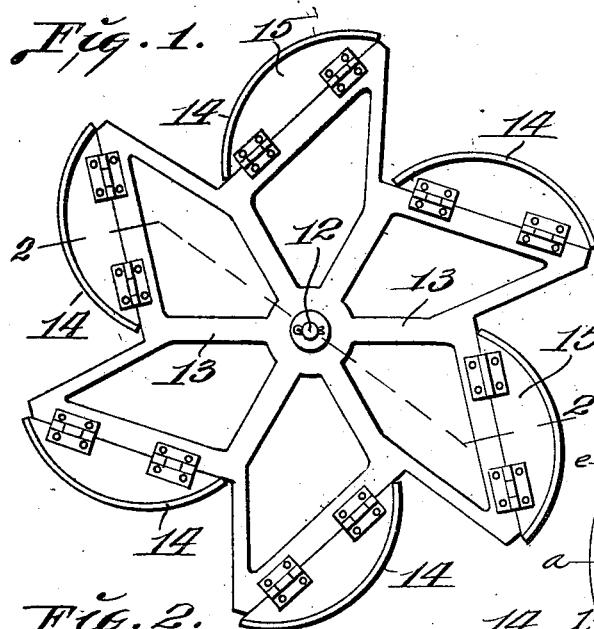
Fig. 1 is a top plan view of a practical form of wind power wheel constructed in accordance with my invention.

Referring by numerals to the accompanying drawing, which illustrates a practical embodiment of my invention, 10 designates a suitable supporting frame work which may be in the nature of a tower and arranged thereon at suitable points are bearings 11 for a vertically disposed shaft 12.

Fixed in any suitable manner to the upper portion of this shaft, and preferably above the top of the frame work 10, is a horizontally disposed skeleton frame work or spider 13, the same serving as a support for the vanes or wings of the power wheel.

These vanes or wings 14 are preferably constructed of relatively thin sheet metal, and each having the form of an oblong rectangular panel that is arranged in an upright position with its length or greatest dimension vertically disposed.

Each vane or wing is curved transversely on a definite or predetermined radius that is obtained in a manner hereinafter more fully set forth, and secured to the inner face of each vane, at a point substantially above its longitudinal center, is a horizontally disposed rail or bar 15, the same being hinged in any suitable manner to the frame or spider 13, so as to swing on a horizontal axis. The outer edges of the blades, vanes or wings 14 point tangential to the circle in which they travel and from their outer edges the blades are arcs of a circle of less diameter than the radius of the wheel. The axis of the hinges connecting a blade to the frame is at an angle of about 90° relative to the radial line which it crosses at the inner edge of the blade.

Arranged for sliding movement upon the upper portion of shaft 12 is a collar 16, and pivotally connected to the upper portion thereof are the lower ends of thrust rods 17, the upper end of each rod being pivotally connected to one of the bars or rails 15.

Arranged to slide freely upon the shaft 12, below the collar 16, is a vertically disposed frame 18, the top of which is adapted to engage the under side of collar 16 when said frame is moved upwardly. Any suitable means may be provided to move the frame work 18 upward, and in Fig. 2, I have illustrated a simple arrangement that includes a windlass 19 and a cable 20 that is adapted to wind upon the drum of the windlass and which cable passes over a suitably located pulley 21.

After frame 18 has been elevated the windlass may be locked or held against rotary movement in one direction by a pawl 22 that engages the teeth of the ratchet wheel 23, which latter is located on the shaft of the windlass.

The transverse curvature and the relative arrangement of the vanes or wings is determined as follows:

A circle having the same diameter and circumference as the wheel that is to be produced is drawn and if a wind wheel having six blades is contemplated, the circle such as —A— is divided into six equal parts by the diametrically disposed lines a—a, b—b and c—c.

Figure 3:
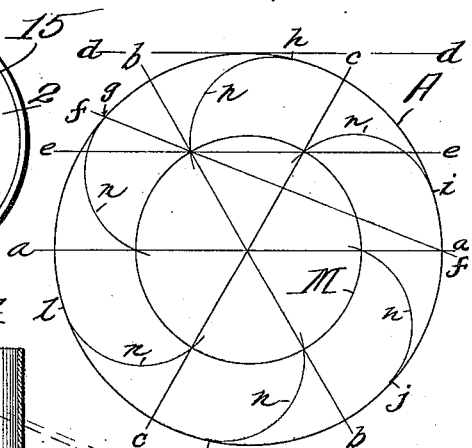
Fig. 3 is a diagrammatic view that graphically illustrates the formula of construction and arrangement of the vanes or blades for a wind power wheel having six vanes or blades.

A straight line d—d is drawn, that is parallel with any one of the diametrically disposed lines a—a, b—b or c—c. For instance, the line a—a as illustrated in Fig. 3 and said line d—d being tangent to the circle —A—. A straight line e—e is now drawn at a point halfway between and parallel with lines a—a and d—d, after which a line f—f is drawn across that portion of the circle between the lines a—a and d—d and which line f—f intersects the point of intersection between the right hand end of line a—a and the circle —A—, and likewise intersecting the point of intersection between lines b—b and e—e.

The point —g— of intersection between the left hand portion of line f—f and the circle —A— is the point on said circle that defines the positions of the outer edges of the vanes or wings and, starting at this point —g— said circle is divided into six parts and the points between said parts being designated by the letters h, i, j, k and l, each of the last mentioned points representing the vertical line that is to be occupied by one of the vanes or wings.

A relatively small circle —M— is now drawn concentric with circle —A—, which smaller circle intersects the point of intersection between lines b—b and f—f. The point of a compass is now placed on this line —M— and the arc of a circle is drawn so that it will intersect the point —g—, which is the fixed point for the outer vertical edge of one of the vanes, and the point of intersection between the smaller circle —M— and the diametrically disposed line a—a.

The arc —n— thus produced and which determines the transverse curvature or radius of the vanes of the wind wheel, are reproduced at equal distances apart or between the remaining segments of the circles —A— and —M—, with the outer ends of said arc intersecting or coinciding with the points h, i, j, k and l respectively and with the inner ends of said arcs intersecting the points of intersection between the smaller circle —M— and the diametrically disposed lines a—a, b—b and c—c.

Thus the arcuate lines such as —n— determine the transverse curvature or radius of the vanes and likewise the relative positions thereof upon the frame or spider 13, and where the vanes are thus formed and positioned and the wind is moving in a horizontal direction toward the wind wheel, there will always be three of the vanes in service, that is, three of said vanes will be subjected to the pressure of the wind.

Further, this particular construction and arrangement of the vanes is effective in obtaining the maximum degree of power from the wind that contacts with the blades during the operation of the power wheel.

In the event that it is desired to produce a wind power wheel having eight vanes or blades, practically the same system of laying out the diagram is used as where a diagram for a six vane wheel is produced. But in the diagram for the eight vane wheel, the distance from the line —O—, representing the circumference of the wheel, to one of the diametrically disposed lines p—p, is divided into three equal parts by the lines q—q, r—r and s—s. The smaller concentric circle —T— is drawn with a radius equal to two-thirds of the radius of the larger circle and a diagonally disposed line v—v is drawn through the points of intersection between the line p—p and the larger circle and the point of intersection between the smaller circle and one of the diagonally disposed lines, thus giving the point —x— on the larger circle, which determines the location for the vertical outer edges of the planes and the arcs of curvature or radius —z— of the vanes terminating at the inner smaller circle. (See Fig. 4.)

With the diagrams thus produced, it will be a comparatively easy matter to properly shape and arrange the vanes of the wind wheel contemplated by my invention, and should it be desired to construct a wheel with a greater number of vanes, practically the same formula as hereinbefore described is utilized for obtaining the desired lines and positions for the vanes.

Figure 4:
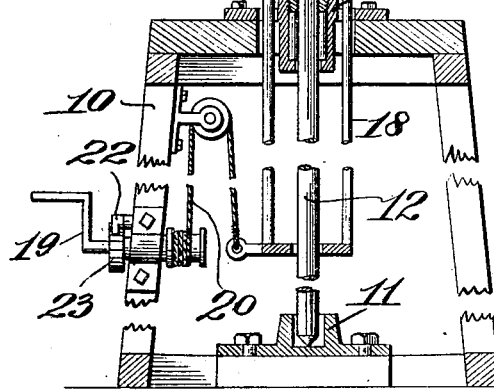
Fig. 4 is a diagrammatic view that graphically illustrates the formula of construction and arrangement of the vanes or blades for a wind power wheel having eight vanes or blades.

In a wind wheel of the type disclosed in Figs. 1 and 3, each vane has a radius of approximately 42°, while in the type of wheel shown in Fig. 4 each vane has a radius of approximately 35°.

Figure 2:
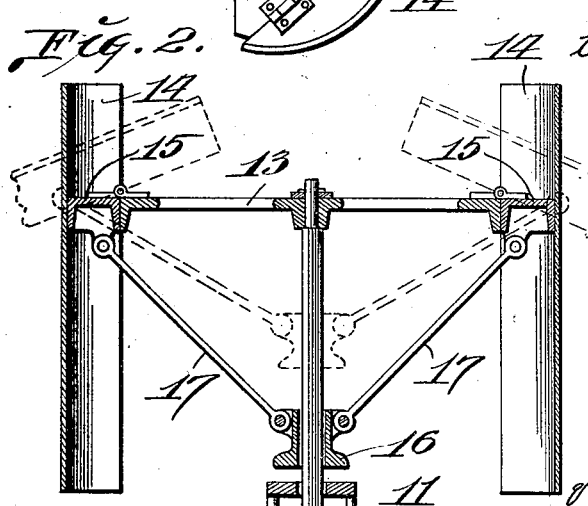
Fig. 2 is a cross section taken approximately on the line 2—2 of Fig. 1.

When the vanes of the wheel are not subject to wind pressure they maintain vertical positions, as illustrated in Fig. 2, by gravity and when subjected to wind pressure and as the latter gradually increases the vanes will, by contrifugal force, swing on their points of pivotal connection with the frame 13 and gradually shift into angular positions, as illustrated by dotted lines in Fig. 2, and which positions are determined by the force or pressure of the wind.

In the event that it is desired to render the wind wheel inoperative while the wind is blowing, windlass 19 can be manipulated to elevate frame 18 and the upper end of the latter will engage a moving thimble 16 upwardly on shaft 12, with the result that the vanes 14 will be swung into substantially horizontal positions.

A wind power wheel of my improved construction is comparatively simple, is capable of being easily and cheaply produced and the particular formation and arrangement of the vanes is effective in obtaining a maximum degree of power from the wind pressure against said vanes or blades.

It will be readily understood that minor changes in the size, form and construction of the various parts of my improved wind power wheel may be made and substituted for those herein shown and described without departing from the spirit of my invention, the scope of which is set forth in the appended claims.

I claim as my invention:

1. In a wind power wheel, a vertically disposed shaft, a frame carried thereby and a plurality of vertically disposed, transversely curved vanes hinged to said frame so as to swing from vertical into substantially horzontal positions by centrifugal force.

2. In a wind power wheel, a vertically disposed shaft, a frame carried thereby, a plurality of vertically disposed, transversely curved vanes hinged to said frame so as to swing from vertical into substantially horizontal positions by centrifugal force and means for positively swinging said vanes outwardly upon their axes of movement to render the wheel more or less inoperative.

3. In a wind power wheel, a rotatably mounted frame, a series of vertically disposed, transversely curved vanes hinged to said frame so as to swing upon horizontally disposed axes, the curvature of said vanes being tangent to the periphery of the wheel.

4. In combination, a vertical shaft, a spider upon the upper end of the vertical shaft, blades pivotally connected to the spider at points above their centers, said blades being curved in horizontal cross section and the outer edges of the blades pointing in lines tangential to the circle in which they travel and the axes of the pivots being substantially at right angles to radial lines which they cross at their inner ends.

5. In a wind power wheel, curved vanes mounted to normally occupy a vertical position and to be swung to a horizontal position or any position intermediate of the two under the action of centrifugal force.

In testimony whereof I have signed my name to this specification.

ZACARIAS DOMINGUEZ.